(12) United States Patent
Georgel et al.

(10) Patent No.: US 8,358,595 B2
(45) Date of Patent: Jan. 22, 2013

(54) METHOD FOR KEEPING THE ROUTING TABLES OF AN UNSTABLE DISSEMINATION NETWORK UP TO DATE

(75) Inventors: Dominique Georgel, Taverny (FR); Laurent Iozelli, Paris (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/746,571

(22) PCT Filed: Dec. 3, 2008

(86) PCT No.: PCT/EP2008/066689
§ 371 (c)(1),
(2), (4) Date: Jan. 18, 2012

(87) PCT Pub. No.: WO2009/071571
PCT Pub. Date: Jun. 11, 2009

(65) Prior Publication Data
US 2012/0113867 A1    May 10, 2012

(30) Foreign Application Priority Data
Dec. 3, 2008    (WO) ................. PCT/EP2008/066689

(51) Int. Cl.
*H04L 12/28*    (2006.01)
(52) U.S. Cl. ........................................ 370/255; 370/312
(58) Field of Classification Search ................. 370/400, 370/389, 254, 255, 312
See application file for complete search history.

(56) References Cited

U.S. PATENT DOCUMENTS

| | | | | |
|---|---|---|---|---|
| 5,579,480 | A * | 11/1996 | Cidon et al. .................. | 709/243 |
| 7,388,869 | B2 * | 6/2008 | Butehorn et al. ............. | 370/401 |
| 7,400,596 | B1 * | 7/2008 | Robertson et al. ........... | 370/312 |
| 2004/0132451 | A1 * | 7/2004 | Butehorn et al. ............. | 455/445 |
| 2004/0215813 | A1 * | 10/2004 | Halna Du Fretay et al. .. | 709/236 |
| 2005/0105524 | A1 * | 5/2005 | Stevens et al. ............... | 370/389 |
| 2006/0039385 | A1 * | 2/2006 | Bare et al. .................... | 370/400 |
| 2011/0310733 | A1 * | 12/2011 | Tzamaloukas et al. ....... | 370/230 |

FOREIGN PATENT DOCUMENTS
EP    1511234    3/2005

OTHER PUBLICATIONS

Stanze, O., et al., "Mobility adaptive self-parameterization of routing protocols for mobile ad hoc networks," IEEE Wireless Communications and Networking Conference, 2006, Las Vegas, NV, Apr. 3-6, 2006, pp. 276-280.

* cited by examiner

*Primary Examiner* — Chuong T Ho
(74) *Attorney, Agent, or Firm* — Stroock & Stroock & Lavan LLP

(57) ABSTRACT

A method for keeping the routing tables of the nodes of an unstable dissemination network up to date, the nodes joining or leaving said network unpredictably. A node periodically sends a synchronization message to all other remote nodes. The period for sending a synchronization message to all other remote nodes increases when the network is tending to stabilize, the remote nodes all being synchronized and the local routing table not evolving. A node sends a synchronization message to another remote node particularly when the other node is desynchronized.

19 Claims, 2 Drawing Sheets ical Application No. 0708454, filed Dec. 5, 2007,
METHOD FOR KEEPING THE ROUTING TABLES OF AN UNSTABLE DISSEMINATION NETWORK UP TO DATE

CROSS REFERENCE TO RELATED APPLICATIONS

This application is the U.S. National Phase application under 35 U.S.C. §371 of International Application No. PCT/EP2008/066689, filed Dec. 3, 2008, and claims the benefit of French Patent Application No. 0708454, filed Dec. 5, 2007, all of which are incorporated by reference herein. The International Application was published on Jun. 11, 2009 as WO 2009/071571.

FIELD OF THE INVENTION

The present invention relates to a method for keeping the routing tables of the nodes of an unstable dissemination network up to date, said nodes joining or leaving said network unpredictably. It applies notably in the field of extended heterogeneous networks, for example military networks.

BACKGROUND

Data dissemination networks differ from messaging networks in that the former are centered around data which they distribute to users whereas the latter are centered around messages which they distribute to recipients. Quite often, in a data dissemination network, each data consumer is interested in one or more types of data in particular. He therefore wishes to receive all data of this type or these types which are sent on the network. To this end, he subscribes to the types of data which are of interest to him, which is why he is called a subscriber. A subscriber does not know the producer or producers of the data that he is consuming in the network—he is also said not to know the publisher of said data. Likewise, the publisher does not know the subscribers to the types of data that he produces. Thus, there is no relationship directly established between the producers and the consumers, which present themselves independently to nodes forming the network. This is the reason that the coupling between a subscriber and a publisher in a dissemination network is said to be loose. By contrast, in a messaging network, the sender and the receiver of a message know one another. For this reason, the coupling is said to be tight.

Data dissemination networks are more particularly used in military systems. These systems are characterized firstly by the heterogeneity of the applications and of the means of communication implemented. By way of example, a wired network linking static ground platforms may be involved, said wired network itself being connected to radio networks linking mobile platforms, be they ground-based, naval or airborne. This heterogeneity limits the performance of the network in terms of passband, latency and bit rate. These systems are secondly characterized by the instability of the topology of the network. It is because, since each platform takes a node of the network onboard, the nodes on a mobile platform are able to join or leave the network at any moment according to the operational constraints on the field. Applications can also move from one dissemination mode to another, for example in the case of a change of operations. This instability affects the means of communication. The routing tables, commonly called forwarding tables and providing a local indication for a node regarding the other nodes to which it may need to transfer data which it receives, must continually be updated according to the changes in the topology of the network. These constraints concerning the heterogeneity of the means of communication and instability of the topology of the network need to be taken into account quite particularly in order to disseminate the data effectively while retaining a reasonable signaling/payload ratio.

In order to attempt to overcome the difficulties posed by the heterogeneity of interchanges, web technology based notably on the SOAP (simple object access protocol) protocol has been introduced into military systems. By way of example, it is possible to cite the WSDL (Web Service Description Language) language for describing interfaces for accessing a service or else the WS-Addressing (Web Service Addressing) standard for specifying the format for addressing messages or else the WS Security (Web Service Security) standard for safeguarding interchanges. These standards are themselves defined from other standards such as the XML (eXtensible Markup Language) language. In fact, this involves the use of web standards to define an interoperability framework between the nodes.

In order to overcome the difficulties posed by the instability of the dissemination topology, the RTPS (Real-Time Publish-Subscribe) protocol is the most promising track. RTPS is the interoperability protocol of the DDS (Data Distribution Services) standard. Proposed by the OMG (Object Management Group), DDS and RTPS are indeed one of the most accomplished standard propositions. The DDS standard proposes defining the data dissemination topology by initially defining DDS nodes. Each DDS node subsequently uses the RTPS protocol to first of all discover the other nodes and to then discover the instances of production and consumption of data declared dynamically on these nodes. To that end, messages known as "signaling" messages are interchanged between the DDS nodes. However, RTPS is based on the premise that the support network is a local area network (LAN) using the IP (Internet protocol) protocol, which implies notably that it is homogeneous and stable and that its passband is constant and almost unlimited. Furthermore, it is effectively found to be the case that RTPS is not suited to an extended heterogeneous network of WAN (Wide Area Network) type, such as a military system. RTPS defines a protocol for discovering the nodes of the dissemination network which is called SDP (Simple Discovery Protocol) and which can be deployed only on LAN-networks of small or medium size. The principle is based on the periodic sending of information to a static list of recipient nodes, with neither history nor fault tolerance. Moreover, the mechanisms for interchanging information concerning the DDS subscriptions between the nodes are based on the sending of messages to this same list of nodes upon an event, an event being addition, deletion or modification of a subscription. This can lead to an explosion in the number of signaling messages interchanged, for example in the case of an unstable dissemination network in which numerous applications enter and leave the network. This is why it is still said that RTPS "does not support the scaling" of heterogeneous WANs or else that it is not "scalable".

More generally in the rest of the present document, the terms "network" and "dissemination network" will be used indiscriminately. The dissemination network represents all of the dissemination nodes used and the means of communication which they use to communicate.

SUMMARY OF THE INVENTION

The notable aim of an embodiment of the invention is to keep the routing tables in a dissemination network whose topology is unstable up to date. In order to reduce the time for detecting desynchronizations while limiting the quantity of signaling interchanges, the invention notably proposes a solution for detecting many desynchronizations with a single message, by making the nodes work with one another. To this end, the subject matter of the invention is a method for keeping the routing tables of the nodes of an unstable dissemination network up to date, said nodes joining or leaving said network unpredictably. A node periodically sends a synchronization message to all other remote nodes, the period for sending a synchronization message to all other remote nodes increasing when the network is tending to stabilize, the remote nodes all being synchronized and the local routing table not evolving. A node exceptionally sends a synchronization message to another remote node particularly when said other node is desynchronized.

By way of example, a synchronization message may contain information allowing deduction of the most recent version of the local table of the node and information allowing deduction of the versions of those tables of the other remote nodes which are known by the node. Thus, a synchronization message can be sent exceptionally to another remote node when said other node has previously sent a synchronization message allowing deduction that it does not know the most recent version of the local table of the node.

Advantageously, before exceptionally sending a synchronization message to another remote node, the node waits for a given time after reception of the synchronization message sent by said other node and/or waits to receive a message confirming the desynchronization.

The network may be heterogeneous, the dissemination nodes using different means of communication.

Advantageously, in order to exceptionally send a synchronization message to another remote node, a node can firstly send the synchronization message to groups of compulsory remote nodes, of which said other node is part, all the nodes in said groups compulsorily receiving the synchronization message. The node can secondly send the synchronization message to a group of optional remote nodes, a node in said group receiving the synchronization message only if it is on a path leading to a compulsory node.

In one embodiment, a node, joining the network can become affiliated to a group formed by all the nodes of this network and can become affiliated to groups formed by the nodes involved in the same subnetwork as it. It should be clarified that the functionality of affiliation to a group is not provided by the dissemination network, but rather by routers in the underlying network. The functions provided by these routers are explained in detail below. It should also be clarified that, in the present application, the term "subnetwork" cannot ever be limited to an IP subnetwork. Examples of subnetworks are given below. A node leaving the network can become disaffiliated from the group formed by all the nodes in the network and become disaffiliated from the groups formed by the nodes involved in the same subnetwork as it. By way of example, the groups of compulsory remote nodes may be the groups formed by the nodes involved in the same subnetwork as the node. The group of optional remote nodes may be the group formed by all the nodes in the network.

By way of example, the synchronization message periodically sent to all other remote nodes may contain the local table of the node, accompanied by a version number, and identifiers for the other remote nodes which are known by the node, accompanied by the version numbers of their local table. The synchronization message sent exceptionally to another remote node may, for its part contain a version number for the local table of the node and information allowing deduction of the most recent version of the local table of the node from the version of the local table of the node whose number is contained in the message. Advantageously, the version number of the local table of the node may be that of the version preceding the most recent version.

The information concerning the routing tables contained in a synchronization message can be digitally coded so as to reduce the total quantity of information forming the message. The routing information can be represented from channels, each channel being the root of a flow tree. Digital codes can be associated dynamically with these channels/flows. The digital coding can persist for a given period so as to limit the instances of code creation/deletion despite the instability of the network. If the network is sufficiently stable, the digital coding can be predefined. Advantageously, all the payload messages sent on the network can have their routing information coded in the same form as in the synchronization messages, so as to reduce the total quantity of information forming the messages. Moreover, the synchronization messages can be encoded in compliance with the PER ASN1 standard.

An embodiment of the invention still has the main advantages that it allows the signaling of the network to be combined with the dissemination of the useful data by simply creating a type of data which is dedicated to signaling in a data dissemination network. In this way, the invention is able to make use of the existing infrastructure of the dissemination network: by way of example, it can use structures organized into a hierarchy of channels and flows which are already available, as will be explained in detail below. The invention thus does not require an infrastructure dedicated to signaling to be put in place. Furthermore, the signaling according to the invention can benefit from all the advantages and services provided by the existing underlying network, on which the dissemination nodes are used. By way of example, even if multiple paths are available for joining a single set of remote nodes, the signaling traffic is optimized on the basis of the topology of the network and the localization of the producers and consumers. Various services are also available, for example rights management services, interchange safeguarding services, data compression services or else services linked to quality of service (QoS). QoS services notably allow priority to be given to signaling interchanges or the latter to be allocated some of the passband. All of this brings appreciable cost advantages, since it is not necessary to redevelop such services. Furthermore, it should be noted that this use of a data dissemination network for interchanging signaling information is not to the detriment of the bit rate available for disseminating the useful data. Quite to the contrary, the services according to the present invention which have been cited above for the limiting the volume of signaling interchanges advantageously allow a reduction in the volume of useful data interchanges too. Thus, the network's capabilities of disseminating useful data are not diminished. In some cases, its capabilities of disseminating useful data may even be improved by the present invention! It should also be noted that the signaling according to the invention can be used on networks other than IP networks, notably wireless networks with a limited passband, of UHF, VHF or HF type, and on any combination of these types of networks.

BRIEF DESCRIPTION OF DRAWINGS

Other features and advantages of the invention will emerge with the aid of the description which follows with reference to the appended drawings, in which.

DETAILED DESCRIPTION

Figure 1:
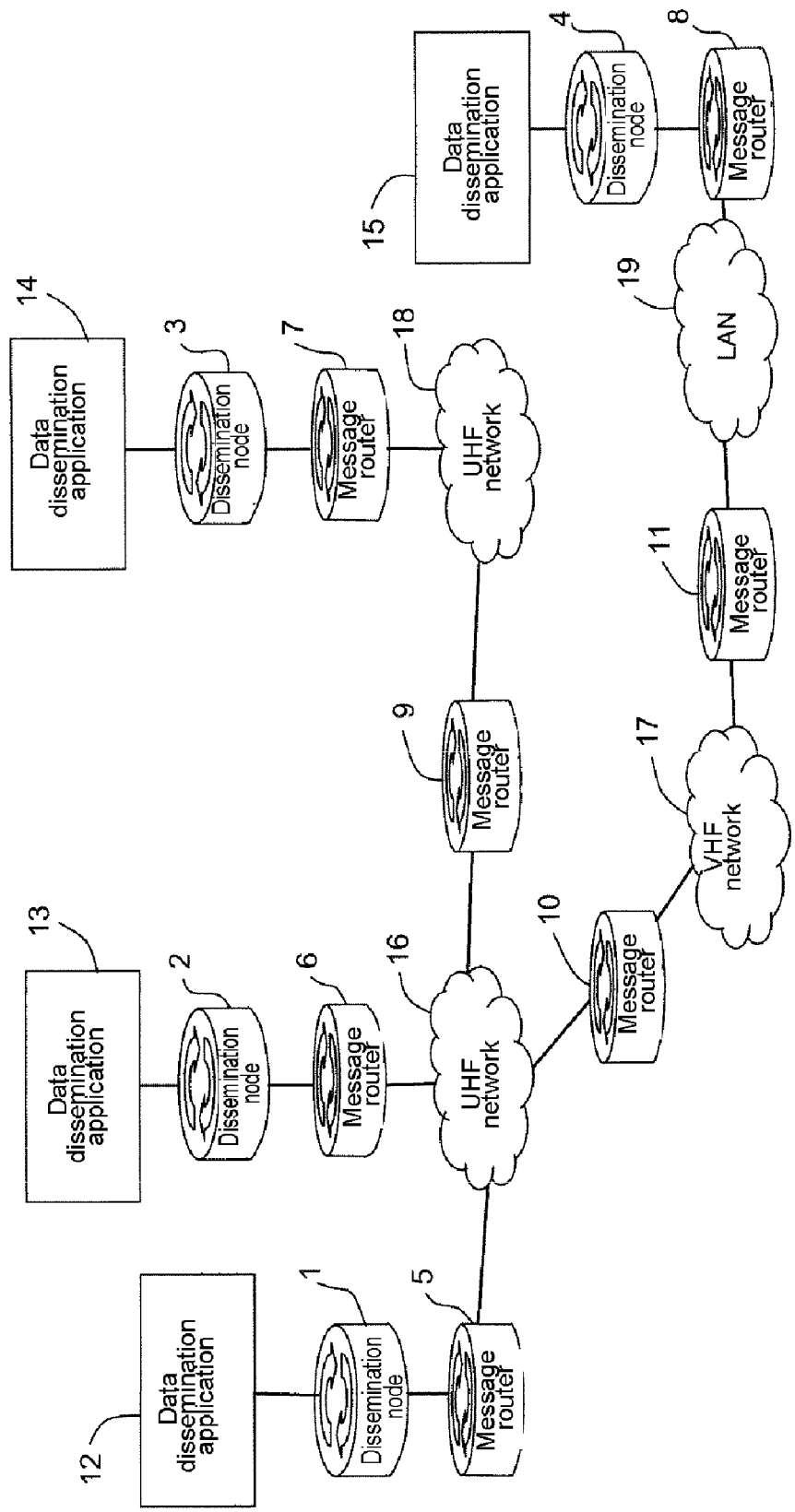
FIG. 1 shows an overview diagram of an example of network architecture which allows the implementation of the method according to the present invention.

FIG. 1 uses an overview diagram to illustrate an example of network architecture which allows the implementation of the method according to the present invention in a highly distributed data dissemination network, in order to maintain routing tables therein. Dissemination nodes 1, 2, 3 and 4 form a network. The signaling method according to the invention is implemented at the level of the nodes 1, 2, 3 and 4 which already provide data dissemination services for applications 12, 13, 14 and 15, respectively. To that end, the nodes 1, 2, 3 and 4 are the users of a message distribution network made up of message routers 5, 6, 7, 8, 9, 10 and 11. The routers 5, 6, 7, 8, 9, 10 and 11 are used for transmitting the signaling between the nodes 1, 2, 3 and 4, and also the payload messages. They are the subject matter of another patent application filed by the applicant. The dissemination nodes 1, 2, 3 and 4 are users of the routers 5, 6, 7, 8, 9, 10 and 11, which offer services to ensure that messages are routed on the dissemination network, both payload messages and signaling messages. The routers 5, 6, 7, 8, 9, 10 and 11 notably take on the optimization of the routing of the signaling. They notably allow some QoS to be allocated to the signaling, the best path for transferring the signaling to be chosen, the signaling to be routed on non-IP networks or else the signaling to be routed on networks with heterogeneous technologies and passband constraints. They also take on the definition of groups of optional recipient nodes and groups of compulsory recipient nodes, and the affiliation to these groups of nodes. This mechanism of groups of recipient nodes can be particularly useful when a node joins the grid. Indeed, it can advantageously allow a dedicated "group of the nodes" to be created in order to represent all of the nodes in the grid. The information interchanged between the members of the group of the nodes is signaling information. Reference will subsequently be made indiscriminately to "signaling messages" or even simply "signaling" to describe the signaling information interchanged between the nodes. Advantageously, the nodes 1, 2, 3, and 4 can become affiliated to or disaffiliated from said group of the nodes in order to respectively join or withdraw from the grid. A message sent to the group is transmitted to all of the nodes affiliated to this group using methods of interchange which are provided by the routers 5, 6, 7, 8, 9, 10 and 11, of point-to-multipoint or multicast type, depending on the opportunities of the networks used, possibly combining the two methods. As will be described in detail below, the routers 5, 6, 7, 8, 9, 10 and 11 can advantageously allow the signaling to be routed by specifying compulsory recipient nodes and optional recipient nodes. The aim being to route the signaling to the optional nodes if they are situated on the paths used for joining the compulsory nodes. By making clever use of these mechanisms provided by the routers 5, 6, 7, 8, 9, 10 and 11, as will be described in detail below, the method according to the present invention considerably improves the conventional "hello" mechanism.

Each of the nodes 1, 2, 3 and 4 of the dissemination grid sends the remote nodes the information relating to the instances of production and consumption of data provided by the application 12, 13, 14 or 15 which is respectively attached to it. The instances of production and consumption are described by hierarchically structured channel names and flow names, each channel being the root of a flow tree. A channel is identified by its name. Equally, a flow is identified by its name. By way of example, a channel can be called "potential". A first flow in said channel can be called "arming" and a second flow in said channel can be called "motivity". A subflow in this second flow can be called "motivity/fuel" and another subflow in this second flow can be called "motivity/motor_state". It should be noted that the concatenation of a channel name and a flow name is comparable to a "topic" name in the DDS standard. It should also be noted that the name of a channel can be compared to a name space in the WSBrokeredNotification standard proposal. A list of the channels and the flows produced and consumed on a node constitutes the local routing table or "forwarding table" of this node. The local routing table contains all the information about local subscriptions. It needs to be updated when applications arrive or leave, or else when existing subscriptions are modified.

In line with the method according to the present invention, the routing table of a node contains not only the local routing table but also the local routing tables of remote nodes. A local routing table is identified and versioned, for example by setting up a cyclic m-bit counter, where the number m is equal to the base-2 logarithm of the maximum value that the counter can take. The node 1 can increment its counter at the definition of new instances of production and/or new instances of consumption by the application 12. It can also increment its counter at the time of the withdrawal of existing instances of production and/or consumption by the application 12. Advantageously, the node 1 may also include timeout or counting mechanisms for grouping together a set of production/consumption modifications. By way of example, when it detects a production/consumption modification, the node 1 can arm a timeout mechanism. The timeout mechanism allows it to await any other instances of production/consumption which it would be able to group together, so as to increment the version number of its local routing table only once. The timeout period may be a configuration parameter. The number m needs to be chosen to be high enough for their to be no possible confusion with a former table which might bear the same number. The number m also needs to be sized in keeping with the timeout period and the maximum time for detecting the inaccessibility of a node. By way of example, if the timeout period is one second and the maximum time for detecting inaccessibility is 1 hour, then m is at least equal to 12, since 12 bits at least are necessary to represent 3600 changes of a version number. In order to protect itself from the risks of denial of service or software errors, the node 1 can adjust the timeout period on the basis of the previous changes made by the application 12 to the list of instances of production/consumption. It can also protect itself from a series of declarations/withdrawals for the same instances of production/consumption demanded by the application 12.

The signaling information routed in the grid can be described using the XML Schema standard defined by the W3C (World Wide Web Consortium). In order to optimize the transfer of the signaling XML documents thus generated, a first optimization may involve the use of effective encoding in compliance with the ASN1 (Abstract Syntax Notation Number One) standard, such as the X.691 standard relating to PERs (Packed Encoding Rules). To make an XML schema correspond to its ASN1 equivalent, the X.694 standard proposed by the ITU (International Telecommunication Union) can be used.

As described in detail previously, the system example allowing implementation of the invention and the architecture of which is illustrated by FIG. 1 anticipates a group of the nodes which can advantageously have the nodes 1, 2, 3 and 4 affiliated to it in order to return to the grid. The identifier of the group of the nodes is known to the message routers 5, 6, 7, 8, 9 10 and 11.

On the basis of the group of the nodes, the method according to the present invention proposes setting up a "hello" mechanism, a "hello" being a message sent by a node to the group of the nodes. The hellos are sent periodically. For a given node among 1, 2, 3 or 4, the period for sending the hellos can vary in the course of time. This period is called the cycle period. Initially, when the node 1 becomes affiliated to the group of the nodes, for example, it can send a first hello to the group. This hello may contain only the local table of the node 1, accompanied by its version number. Next, hellos are sent periodically by the node 1. They may thus contain not only the local table of the node 1, accompanied by its version number, but also the identifiers and version numbers of the routing tables learnt from the other nodes 2, 3, and 4 of the grid by virtue of hellos received by the node 1. Thus, if the node 2 receives a hello sent by the node 1, the node 2 is capable of detecting that the node 1 does not have the latest version of the local table of the node 2. The nodes 1, 2, 3 and 4 send and receive hellos according to the same rules.

By way of example, if the node 1 records that the remote nodes 2, 3 and 4 have the latest version of its local table, it is pointless in transmitting it to them. Therefore, the method according to the present invention proposes that the node 1 puts into its hellos only the single version number of its local table, the content of said table being able to be omitted.

By way of example, if the node 1 records that one or more remote nodes among 2, 3, and 4 are "partially" desynchronized, for example that they know only the last but one version of the local table of the node 1, the node 1 is able to minimize the quantity of information transmitted in the hello. To this end, the hello sent by the node 1 may contain only the number of the last but one version of the local table of the node 1, accompanied by the changes necessary in order to form the latest version. This option, subsequently called partial resynchronization, is used only if the volume of information in the changes made is lower than the volume of the local table.

Advantageously, the node 1 can also increase the cycle period if it does not record any desynchronization of any other nodes 2, 3, and 4 for a certain period. Indeed, the method according to the present invention may provide for the cycle period to be able to be increased progressively as a function of the period which has elapsed since the last resynchronization.

Hellos can also be sent upon an event. By way of example, the node 1 can send a hello outside of the periodic sending cycles, immediately after new declarations of instances of production/consumption on the node 1 by the application 12, for example. Such an immediate hello is called an "out-of-cycle hello". The opportunity to send out-of-cycle hellos may depend on a configuration parameter. The number of out-of-cycle hellos which it is possible to send between two cycles can also be a configuration parameter. Moreover, an out-of-cycle hello may bear partial synchronization, that is to say contain the number of the last but one version of the local table and the changes necessary in order to form the latest version, or complete synchronization, that is to say contain all of the local table.

In order to limit the quantity of hellos interchanged, the sending of an out-of-cycle resynchronization hello can be optional. Indeed, the node 1 can perform the resynchronization in the next cycle only, but by resetting the cycle period to its minimum value. One reason for this may be linked to the fact that the node 1 has already performed several out-of-cycle resynchronizations. Another reason for that may be that the proportion of nodes perceived as being the desynchronized is high, for example two nodes out of the three nodes 2, 3, 4 or a number of nodes which is given as a configuration parameter. In this case, in resetting the cycle period to its minimum value, it is as if the node 1 was sending an out-of-cycle hello for the group of the nodes.

Before sending an out-of-cycle partial resynchronization hello on account of a first desynchronized remote node, for example the node 2, the node 1 can wait to be sure that such a measure will be effective. Indeed, a second desynchronized remote node may not be able to be resynchronized with a partial resynchronization hello because it does not even have the last but one version of the table, for example the node 3. The waiting period can be a configuration parameter.

As will be described in detail below, if the node 1 does not know whether the node 3 and the node 4 cannot be resynchronized with a partial resynchronization hello, the node 1 sends a partial resynchronization hello not only to the node 2 perceived as partially desynchronized but also to the group of the nodes, specifying that the transmission to the group of the nodes is optional because the node 1 does not know their states. The router 5 thus transmits the hello to the node 2 regarded as desynchronized and attempts to transmit the message to the nodes 3 and 4 if they can be reached by the same path. If the node 1 detects that the node 3 is not partially resynchronizable, the node 1 sends an out-of-cycle hello containing all of its local table by applying the same technique as that described previously for out-of-cycle partial resynchronization, that is to say by also sending it to the group of the nodes, specifying that the transmission to the group of the nodes is optional. By means of this mechanism, which is described in detail below, the method according to the present invention considerably improves the hello mechanism.

In the particular case in which the node 1 learns, by means of a hello from a node among 2, 3 or 4, that a set of nodes was not known, that is to say that the grid was split into two subgrids, it does not send an immediate hello so as not to cause an avalanche of resynchronizations.

Moreover, the node 1 can detect that the node 2 appears no longer able to reach it because it no longer receives hellos from the node 2. The period after which the node 1 considers the node 2 to be unreachable is a configuration parameter, called the pre-isolation period. Once the node 1 denotes the node 2 as being isolated, the node 1 deletes the knowledge which it had about the table of the node 2. The node 1 thus considers itself desynchronized in relation to the node 2, but keeps track of the node 2. When it sends a hello, the node 1 also transmits a particular value for the table version identifier of the node 2 which it has isolated. This value is called the isolation identifier. Thus, the node 2 or one node from 3 and 4 in the dissemination grid is able to detect this isolation and to react.

It should be noted that, taking account of the mechanism described previously, the nodes 1, 2, 3 and 4 are not synchronized as far as the transmission of hellos is concerned.

Advantageously, the method according to the present invention likewise provides for a mechanism for digital coding of the channel/flow pairs produced by each of the nodes 1, 2, 3 and 4 to be able to be set up. In the example in FIG. 1, this coding depends on each node, a single channel/flow name being able to have two different codes for two separate nodes. One pursued objective is to see to it that the payload disseminated in the grid uses these codes instead of the channel/flow names in order to minimize the network resources which are necessary. Digital codes are concise. A code has a mask made up of an n-bit node identifier, wherein n is an integer dependent on the base-2 logarithm of the number of nodes which can be used. A code also has a p-bit channel/flow counter, where p is an integer dependent on the base-2 logarithm of the number of flows/channels which are possible throughout the system. The codes thus generated are interchanged between the nodes 1, 2, 3 and 4 of the dissemination grid. They advantageously allow the passband resources used in the grid to be minimized, for example either in order to represent the local routing tables and the changes made thereto in the synchronization messages according to the present invention, or in order to route the payload by replacing the channel/flow names of the headers with a corresponding code, for example. Thus, a node among 1, 2, 3 and 4 which receives a payload using such a code is able to identify the associated channel/flow. Maintenance of the code tables comes within the same mechanisms as maintenance of the channel/flow names produced and consumed by the nodes. Hellos contain these codes, and a code allocated by a node is also versioned. Advantageously, the digital codes allocated to the channels/flows produced by a node among 1, 2, 3 and 4 may be persistent, that is to say that the code may continue to exist even if there are no longer any instances of production for the associated channel/flow on the node. The persistence is limited in time, the period of persistence being a configuration parameter. At the end of this period of persistence, the code can be reused. One pursued objective is to minimize the number p. The persistence also allows, following a starting period for the system, the maintenance of the codes to be limited to the transmission of the version identifiers of these codes between the nodes 1, 2, 3 and 4. The allocation of a code to a channel/flow is performed at the time of the first declaration of production for this channel/flow.

A protection mechanism in case of erroneous sizing can be set up, the channels/flows which exist beyond 2 to the power of p not being coded if the number p chosen is not high enough.

When a code is allocated, a code which is not yet used or the code which is not being used for the longest time is chosen. In order to protect the dissemination system, a code which has already been used is reused only if the time elapsed since its release is greater than the time from which a node considers another node to be isolated, plus a margin for error. One pursued objective is to see to it that a remote node does not use an obsolete code, for example the same code for a different channel/flow.

Other optimizations for the coding mechanism can be envisaged. By way of example, to the extent that the digital codes allocated to the channels/flows do not evolve much over time, notably on account of the persistence mechanism and because the list of channels/flows is limited, cyclic hellos are able to dispense with taking the version identifier of the local table of the codes to each of the cycles. However, this option is provided for the node 1 only if the node 1 regards the nodes 2, 3, and 4 as synchronized, for example. The number of cycles in which the local table of the codes may be omitted can form a configuration parameter. For a node, when transmitting the content of its local table of the codes, another optimization of the coding mechanism may involve transmitting for each code only the p bits identifying the channel/flow, the other part of the code being invariable since it is attached to the node.

The method according to the present invention also provides for the coding to be able to be defined permanently in a factory or later by the network manager. In this case, it is not necessary for the codes to be transported by the signaling. One pursued aim is to allow a dissemination grid to be used on very constrained networks in which the maintenance of the codes is incompatible with the available passbands.

It should be noted that the node 1, for example, uses the code allocated to a channel/flow only if it is certain that the nodes 2, 3 and 4 know it. A configuration parameter can allow determination of whether the coding is used on detection of new nodes. It should also be noted that a node may not detect all of the nodes effectively present in the grid, notably in the event of grid merging being in progress or in the event of a node being in the course of entering the grid. In this case, a node which receives a message bearing an unknown code ignores the message.

As described in detail above, the method according to the present invention notably combines the hello mechanism and the routing table versioning mechanism in order to extend them as a global mechanism for cooperation between the nodes. The global mechanism for cooperation between the nodes firstly stems from the cyclic hellos and from their content, the basic hello mechanism having been described in detail above. The method according to the present invention can advantageously enhance this mechanism by allowing the node 1 to send hellos cyclically to a list of compulsory recipient nodes and to a list of optional recipient nodes. Advantageously, the list of compulsory recipient nodes may be made up by the nodes from 2, 3 and 4, which are in close cooperation with the node 1, for example because they are associated with the same UHF-type communication subnetwork 16 as the node 1, or with the same VHF-type subnetwork 17, or with the same HF-type subnetwork 18 or else with the same LAN 19. Only some nodes in a group cooperate with other groups. By way of example, the list of optional recipient nodes may be the group of the nodes.

This option can be provided in the form of configuration parameters or can be determined by a software module loaded in the node 1 if the previous example is considered. If a software module is used, this can be provided by an administration entity in charge of the utilization of the dissemination grid. The setup of a software module is more complex than configuration, but it provides greater flexibility. By way of example, a software module may provide the option of using proprietary technologies in order to produce dialogues with a management application. In the total absence of configuration, the grid can set up a "round-robin" default strategy on the nodes, by choosing for each cycle a number of nodes in the compulsory group which is dependent on the number of known nodes. By way of example, this number may be half of the nodes of up to ten nodes and the square root of the number of nodes thereafter.

Moreover, the node 1 is, by way of example, authorized not to transmit in its cyclic hellos all of the identifiers of the routing tables learned, but only a subset thereof. The software module loaded in the node 1 may be in charge of determining the size of this subset and the identifiers transmitted. By way of example, the software module can choose to provide the identifiers of 5% of the known nodes. It can also choose the nodes which have sent hellos most recently. The software module can use known design information for the node 1, such as the passband available at the output, and can incorporate the time factor into its choice. The implemented algorithm allows at least the node 1 to determine, from all of the hellos received, whether it is synchronized with all of the other nodes of the grid. A default strategy may involve transmitting the table learnt from the "oldest" known node and the table learnt from the "youngest" known node.

The global mechanism for cooperation between the nodes that is proposed notably by the method according to the present invention then stems from the versioned routing tables learnt from the other nodes, which notably allow a certain fault tolerance. This point has already been set out above. Indeed, the hellos received by a node bearing the routing table version identifiers from other nodes. Consequently, several situations may arise.

A first situation corresponds to the case in which the node 1, for example, records that it is desynchronized. It detects, for example, that it does not have the up-to-date version of the routing table of the node 2 because it receives a hello from the node 3 which bears a later version identifier for the table of the node 2. The node 1 can then send the node 3 a resynchronization request regarding the routing table of the node 2.

A second situation corresponds to the case in which the node 1, for example, records the desynchronization between the nodes 2 and 3 with which it cooperates. Indeed, on receiving the hellos from the nodes 2 and 3, the node 1 can identify routing table desynchronizations between the nodes 2 and 3. The node 1 can thus start a resynchronization procedure for the nodes 2 and 3. Besides the detection of the desynchronizations by third nodes, the cooperation between the nodes is based on the fact that a cooperating node can send a desynchronized node the content of its routing table in order to permit resynchronization.

For numerous reasons, the method according to the present invention preferably takes account of this second situation, notably because it provides the option for the node which detects the desynchronization to resynchronize several nodes by setting the group of the nodes as an optional recipient, for example. Said situation likewise corresponds to the wish to preserve a resynchronization mode close to that of the conventional hello mechanism.

To that end, when the node 1 receives a hello from the node 2 with which it cooperates, if the node 1 detects that the node 2 does not have the correct version of the routing table of the node 3, the node 1 arms a timeout in order to await other hellos which might possibly indicate that the node 2 is up to date. Indeed, it is possible for the node 4 to have recorded the same desynchronization and for the node 4 to have already started resynchronization of the node 2. It is also possible for two other nodes, which are not shown in FIG. 1, to have started resynchronization relating to the local routing table of the node 2 and for the node 3 to have benefited from the resynchronization via the group as an optional recipient, because the node 3 was situated on the path between said two other nodes. It is also possible for the node 1 to itself be late without knowing it. It is also possible for the received hello indicating desynchronization not to provide the last known state of the node 2 relative to the node 3. Finally, it is also possible for the nodes 2 and 3 to have themselves effected a resynchronization hello, because the recipient hellos can evolve over time.

At the end of the timeout period, if no hello indicates that the node 2 is synchronized with the node 3, the node 1 sends a resynchronization hello for the node 2 with the content of the routing table which it has for the node 3. The compulsory recipient of the hello is the node 2. In the present embodiment, the group of the nodes is an optional recipient.

The method according to the present invention proposes enhancing this strategy again. Indeed, the node 1 can detect several desynchronizations of the node 2 from the first hello received which triggered arming of the timeout and from all of the hellos received up to the end of the timeout period. In this case, the node 1 can start resynchronization of the node 2 for all of the desynchronizations detected. It should be noted that, for numerous reasons, the node 1 is authorized to arm only a limited number of timeouts at the same time. On the one hand, these reasons are linked to the passband which is necessary for the resynchronizations. On the other hand, these reasons are linked to the fact that the group which is the optional recipient of the hello is able to resolve some of the recorded desynchronizations, notably when the desynchronizations relate to the same routing tables. The maximum number of timeouts can be a configuration parameter. Having effected the resynchronization of the node 2, the node 1 favors resynchronizations for other nodes, while protecting itself from multiple resynchronizations performed in reduced times. The maximum number of possible resynchronizations for a given period can be a configuration parameter. The number of possible resynchronizations for a same node and for a given period can likewise be a configuration parameter. The method according to the present invention can moreover provide for this limit to be disregarded if the desynchronization is persistent, on condition that the hellos sent allow resynchronization. In order to preserve its resources, the node 1, for example, can arm a timeout only if a sufficiently long period has elapsed since the last synchronization performed, said period being able to be a configuration parameter.

When groups of nodes which cooperate have been defined, the node 1 can, by way of example, favor resynchronizations with the nodes with which they cooperate. In this case, so as not to generate any shortage of resynchronization for the group and for its links to the other groups, the maximum number of possible resynchronizations for a given period is broken down into two values. A first value can be applied to the group and a second value can be applied to the nodes outside of the group. If several timeouts have been armed, those which correspond to priority resynchronizations are favored. Moreover, the node 1, for example, can start only a limited number of resynchronizations at the same time, said number being able to be a configuration parameter. From the highest to the lowest, the resynchronization priorities applied by the node 1, for example, are as follows: first of all, the node 1 can favor resynchronizations with the nodes with which it is in close cooperation for the same group. Next come resynchronizations with the nodes in the same group. Then come resynchronizations with the nodes with which the node 1 is in close cooperation for other groups. Finally, resynchronizations with all other nodes are considered in the last place.

Moreover, in order to preserve the passband resource of a node, it may be selected that this node starts resynchronizations only if it records a persistent desynchronization for the same node. This setting can form a configuration parameter. The resynchronization attempt for the node is stopped if it has no effect.

If numerous nodes are discovered simultaneously, that is to say that the grid was split previously, it is advisable to avoid triggering an avalanche of synchronizations at the time of merging. To this end, the method according to the present invention proposes activating the out-of-cycle synchronization mechanisms only after a period during which the cyclic hellos have been able to resynchronize all of the nodes. The waiting period is dependent on the number of new nodes which have been discovered.

Figure 2:
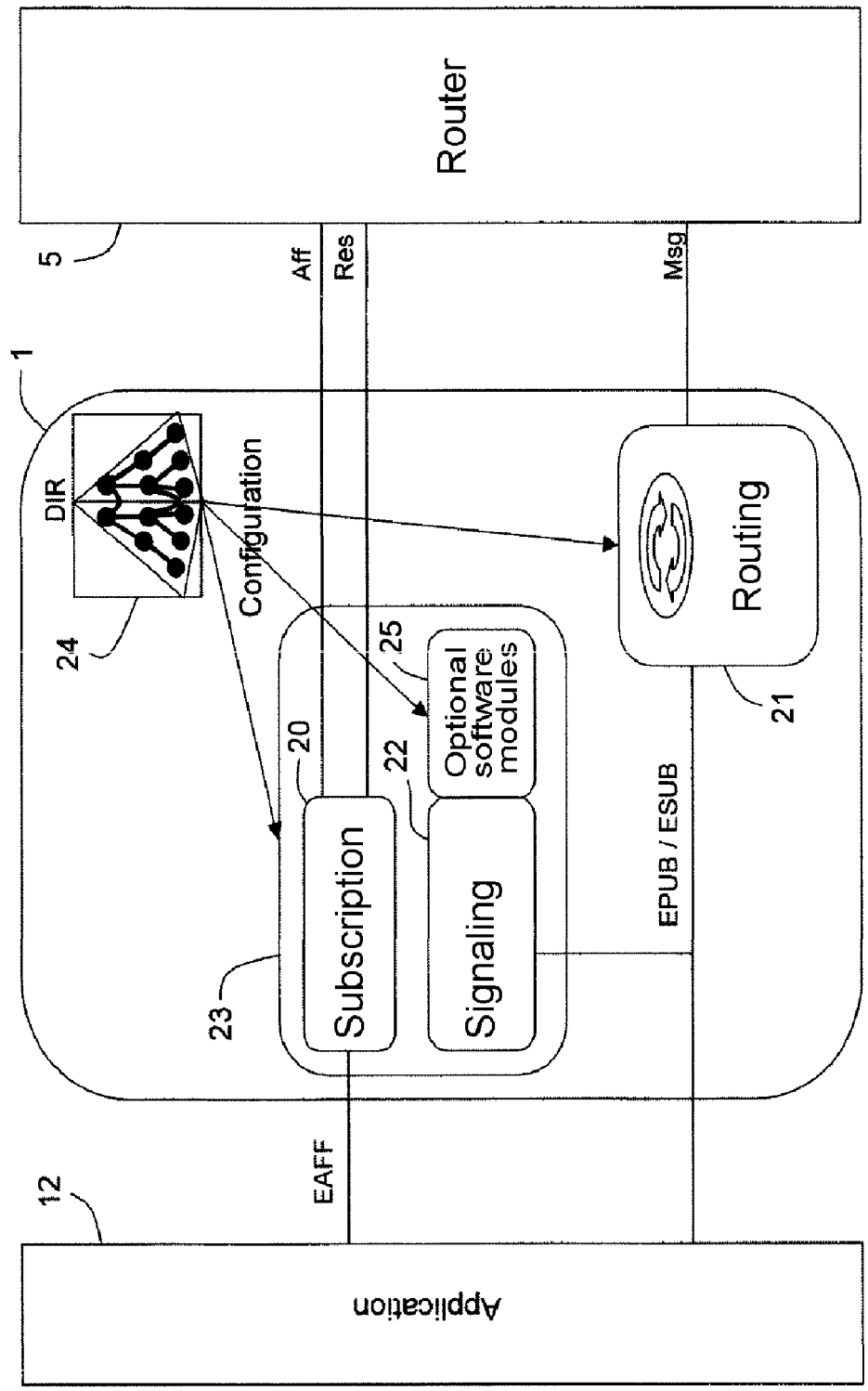
FIG. 2 shows a diagram of an example of node structure which allows the implementation of the method according to the present invention.

FIG. 2 uses a diagram to illustrate a structure example for the dissemination node 1 allowing the implementation of the method according to the present invention.

For its administration, the dissemination node 1 may have an administration interface 24 for adjusting the configuration parameters for the signaling method according to the invention. The dissemination node 1 may have a routing module 21 which has the main function of receiving the local publications sent by the applications and the remote publications received via the message router 5. The module 21 also has the function of determining which are local applications and which are the remote nodes concerned with these applications. An intelligence module 23 may have two submodules. A submodule 22 can manage the signaling method according to the invention. A submodule 20 can manage the subscriptions of the application 12 to publications or subscribable material. The intelligence module 23 may also have a block 25 grouping together optional software modules. A first interface EAFF can allow the application 12 to declare publications or subscriptions. A second interface EPUB can allow the application 12 to publish on a channel/flow name on which it has previously been declared a producer. A third interface ESUB can allow the application 12 to receive publications on a channel/flow name on which it has previously declared subscriptions. The dissemination node 1 can use the "bootstrapping" technique to convey the signaling internally via an interface ISIG, which is not shown in FIG. 2. The intelligence modules of the various utilized nodes, which are identical to the module 23, interchange the signaling with one another. By way of example, to convey this signaling, the intelligence module 23 can use well defined channel/flow names and behave like an application which uses the dissemination network. It is thus able to benefit from all the mechanisms implemented in the lower layers. The intelligence module 23 can use the EPUB and ESUB interfaces to send the signaling messages from the ISIG interface.

The intelligence module 23 can interact with the message router 5 by virtue of an interface Aff, notably for registering the node 1 as a user of the distribution layer for the messages, and for entering the node 1 into the groups predefined for the signaling or dynamically negotiated for the payload transfer. The intelligence module 23 can also interact with the message router 5 by virtue of an interface Res, notably for requesting the allocation of passband resources for a given publication profile on a channel/flow name, and for submitting a latency demand for a given subscription profile on a channel/flow name. The routing module 21 can interact with the message router 5 by virtue of an interface Msg, notably for sending the payload and signaling messages to interested remote dissemination nodes among 2, 3 and 4, and for receiving the payload and signaling messages for the node 1 which have been sent by remote dissemination nodes among 2, 3 and 4.

The advantages of an embodiment of the present invention in relation to RTPS are notably fault tolerance, the ability to scale extended networks, rapid detection of the desynchronizations and limitation of the quantity of signaling interchanged. Moreover, RTPS can be utilized only on transport layers which satisfy fairly heavy constraints in terms of address format and port use, such as UDP/IP. The method according to an embodiment of the present invention still has the main advantages that it allows minimization of the passband necessary for maintaining the routing tables. In a nominal case in which the network is stable and in which the routing information does not evolve much, the signaling sent is reduced to a minimum, the hellos being sent with long periods and containing only version identifiers. However, the system remains reactive to the extent that the declaration of new instances of production/consumption on a node can start an immediate hello. The cooperation between the nodes thus allows reduced synchronization times. Similarly, the provision of numerous configuration parameters allows adjustment of the mechanisms of an embodiment of the method according to the present invention according to needs and utilization.

The invention claimed is:

1. A distributed method for keeping routing tables of nodes of an unstable dissemination network up to date, said nodes joining or leaving said network unpredictably, the method comprising the following steps:

each node periodically sending a synchronization message to all other remote nodes, a period for sending a synchronization message to all other remote nodes increasing when the network is stabilizing, the remote nodes all being synchronized and a local routing table not evolving; and each node sending a synchronization message to another remote node when said another remote node is desynchronized;

wherein for each node:

a synchronization message contains information allowing deduction of a most recent version of the local table of the node and information allowing deduction of versions of tables of the other remote nodes which are known by the node; and a synchronization message is sent to another remote node when said another remote node has previously sent a synchronization message allowing deduction that said another remote node does not know the most recent version of the local table of the node.

2. The method as claimed in claim 1, wherein, before sending a synchronization message to another remote node, each node at least waits for a given time after reception of the synchronization message sent by said other node or waits to receive a message confirming desynchronization.

3. The method as claimed in claim 1, wherein the network is heterogeneous, and the nodes use different means of communication.

4. The method as claimed in claim 1, wherein, in order to send a synchronization message to another remote node, each node:

sends the synchronization message to groups of compulsory remote nodes, of which said other node is part, all the nodes in said groups compulsorily receiving the synchronization message; and sends the synchronization message to a group of optional remote nodes, a node in said group of optional remote nodes receiving the synchronization message only if it is on a path leading to a compulsory node.

5. The method as claimed in claim 4, wherein:

each node joining the network becomes affiliated to a group formed by all the nodes in the network and becomes affiliated to groups formed by the nodes involved in the same subnetwork as it; or each node leaving the network becomes disaffiliated from the group formed by all the nodes in the network and becomes disaffiliated from the groups formed by the nodes involved in the same subnetwork as it.

6. The method as claimed in claim 5, wherein:

for each node, the groups of compulsory remote nodes are the groups formed by the nodes involved in the same subnetwork as the node; and for each node, the group of optional remote nodes is the group formed by all the nodes in the network.

7. The method as claimed in claim 5, wherein for each node:

the groups of compulsory remote nodes are groups formed by nodes involved in the same subnetwork as the node; and the group of optional remote nodes is the group formed by all the nodes in the network.

8. The method as claimed in claim 1, wherein the synchronization message periodically sent by each node to all other remote nodes contains:

the local table of the node, accompanied by a version number; and identifiers for those tables of the other remote nodes which are known by the node, accompanied by version numbers.

9. The method as claimed in claim 1, wherein for each node the synchronization message sent to another remote node contains:
- a version number for the local table of the node; and
- information allowing deduction of the most recent version of the local table of the node from the version of the local table of the node whose number is contained in the message.

10. The method as claimed in claim 9, wherein the version number of the local table of the node is that of a version of the local table preceding a most recent version of the local table.

11. The method as claimed in claim 1, wherein the information concerning the routing tables contained in a synchronization message is digitally coded so as to reduce a total quantity of information forming the synchronization message.

12. The method as claimed in claim 11, wherein the routing tables contain routing information represented from channels, each channel being a root of a flow tree.

13. The method as claimed in claim 11, wherein the digital coding persists for a given period so as to limit instances of code creation or deletion.

14. The method as claimed in claim 11, wherein the digital coding is predefined.

15. The method as claimed in claim 11, wherein all messages sent on the network have respective routing tables which contain routing information coded in a same form as in the synchronization messages so as to reduce a total quantity of information forming the messages.

16. The method as claimed in claim 1, wherein the synchronization messages are encoded in compliance with the PER ASN1 standard.

17. A computer program product encoding program code comprising instructions configured to perform the method of claim 1 when said program code is executed on a processor.

18. A node of an unstable dissemination network configured to implement the method of claim 1.

19. An unstable dissemination network comprising a plurality of nodes, the nodes joining or leaving said network unpredictably, each node configured to implement the method of claim 1.

* * * * *